United States Patent
Pursifull et al.

(10) Patent No.: US 9,752,520 B2
(45) Date of Patent: Sep. 5, 2017

(54) GASEOUS FUEL INJECTOR ACTIVATION

(71) Applicant: Ford Global Technologies, LLC, Dearborn, MI (US)

(72) Inventors: Ross Dykstra Pursifull, Dearborn, MI (US); Samuel Guido, Dearborn, MI (US); Ed Badillo, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 13/907,432

(22) Filed: May 31, 2013

(65) Prior Publication Data

US 2014/0358407 A1 Dec. 4, 2014

(51) Int. Cl.
| | |
|---|---|
| F02D 41/06 | (2006.01) |
| F02D 19/02 | (2006.01) |
| F02D 19/06 | (2006.01) |
| F02D 19/08 | (2006.01) |
| F02D 41/00 | (2006.01) |
| F02D 41/10 | (2006.01) |
| F02D 13/02 | (2006.01) |
| F02D 41/20 | (2006.01) |

(52) U.S. Cl.
CPC ......... *F02D 41/062* (2013.01); *F02D 19/024* (2013.01); *F02D 19/061* (2013.01); *F02D 19/0647* (2013.01); *F02D 19/0692* (2013.01); *F02D 19/081* (2013.01); *F02D 41/0027* (2013.01); *F02D 13/0219* (2013.01); *F02D 41/105* (2013.01); *F02D 2041/2024* (2013.01); *F02D 2041/2051* (2013.01); *F02D 2200/0406* (2013.01); *Y02T 10/32* (2013.01); *Y02T 10/36* (2013.01)

(58) Field of Classification Search
CPC .. F02D 41/062; F02D 41/0027; F02D 19/024; F02D 19/061; F02D 19/0647; F02D 19/0692; F02D 19/081
USPC ......................................................... 701/113
See application file for complete search history.

(56) References Cited

U.S. PATENT DOCUMENTS

| | | | | |
|---|---|---|---|---|
| 5,199,260 | A * | 4/1993 | Iwick .................... | F02B 37/186 137/107 |
| 5,632,250 | A * | 5/1997 | Kato .................... | F02D 41/0027 123/198 DB |
| 6,009,860 | A * | 1/2000 | Brown .................... | F02D 17/04 123/198 DB |
| 6,250,286 | B1 | 6/2001 | Hoenig et al. | |
| 6,276,340 | B1 * | 8/2001 | Kato .................... | F02D 41/062 123/179.16 |

(Continued)

FOREIGN PATENT DOCUMENTS

JP 2012-207629 * 10/2012

OTHER PUBLICATIONS

Pursifull, Ross Dykstra, "Gaseous Fuel Rail Depressurization During Inactive Injector Conditions," U.S. Appl. No. 13/623,695, filed Sep. 20, 2012, 42 pages.

(Continued)

*Primary Examiner* — Jacob Amick
(74) *Attorney, Agent, or Firm* — Julia Voutyras; McCoy Russell LLP

(57) ABSTRACT

A method for starting an engine is provided. The method comprises in response to an engine start request, cycling a gaseous fuel injector prior to activating a starter motor. In this way, delayed engine starts using gaseous fuel may be mitigated.

10 Claims, 8 Drawing Sheets

(56) References Cited

U.S. PATENT DOCUMENTS

| | | | | |
|---|---|---|---|---|
| 8,095,294 | B1* | 1/2012 | Griffiths | F02D 35/024 |
| | | | | 123/525 |
| 8,347,862 | B2 | 1/2013 | Pursifull | |
| 2010/0299047 | A1* | 11/2010 | Kratt | F02M 43/00 |
| | | | | 701/103 |
| 2011/0088655 | A1* | 4/2011 | Ancimer | F02D 41/0027 |
| | | | | 123/299 |
| 2011/0168129 | A1* | 7/2011 | Kurtz | F02D 19/061 |
| | | | | 123/294 |
| 2014/0358407 | A1* | 12/2014 | Pursifull | F02D 41/062 |
| | | | | 701/113 |

OTHER PUBLICATIONS

Pursifull, Ross Dykstra et al., "Gaseous Fuel Injector Activation," U.S. Appl. No. 13/907,463, filed May 31, 2013, 49 pages.

* cited by examiner

GASEOUS FUEL INJECTOR ACTIVATION

FIELD

The present disclosure relates to gaseous fuel injection.

BACKGROUND AND SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. A pressure regulator may then be used to supply the compressed natural gas (CNG) at lower pressures to an engine combustion chamber via a fuel injector. During engine start-up, the fuel rail supplying fuel to the fuel injector may experience an over-pressure event. This over-pressurized fuel rail may create a large pressure differential across the inward-opening injector, inhibiting opening of the injector and delaying (or preventing) engine start. Further, during engine cranking, less voltage (and thus the current that provides injector opening force) may be available at the injector than during engine running conditions. Thus, extra current which may provide extra force to overcome the pressure differential and open the injector is not available.

The inventors herein have recognized that opening the fuel injectors prior to activating the starter motor, when extra current is available to open the injectors even in the presence of a high pressure differential across the injectors, results in less stiction at the injectors during the subsequent engine start-up. Accordingly, a method for starting an engine is provided. The method comprises in response to an engine start request, cycling a gaseous fuel injector prior to activating a starter motor.

In this way, the gaseous fuel injector may be opened prior to cranking the engine. Opening the injector may reduce the pressure differential across the injector and effectively loosening the injector. The reduced pressure differential in turn reduces the amount of current that is required to open the fuel injector. Thus, during an engine start or other condition where a gaseous fuel injector is activated during high fuel rail pressure, the injector may be rapidly opened, mitigating delayed engine starts.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
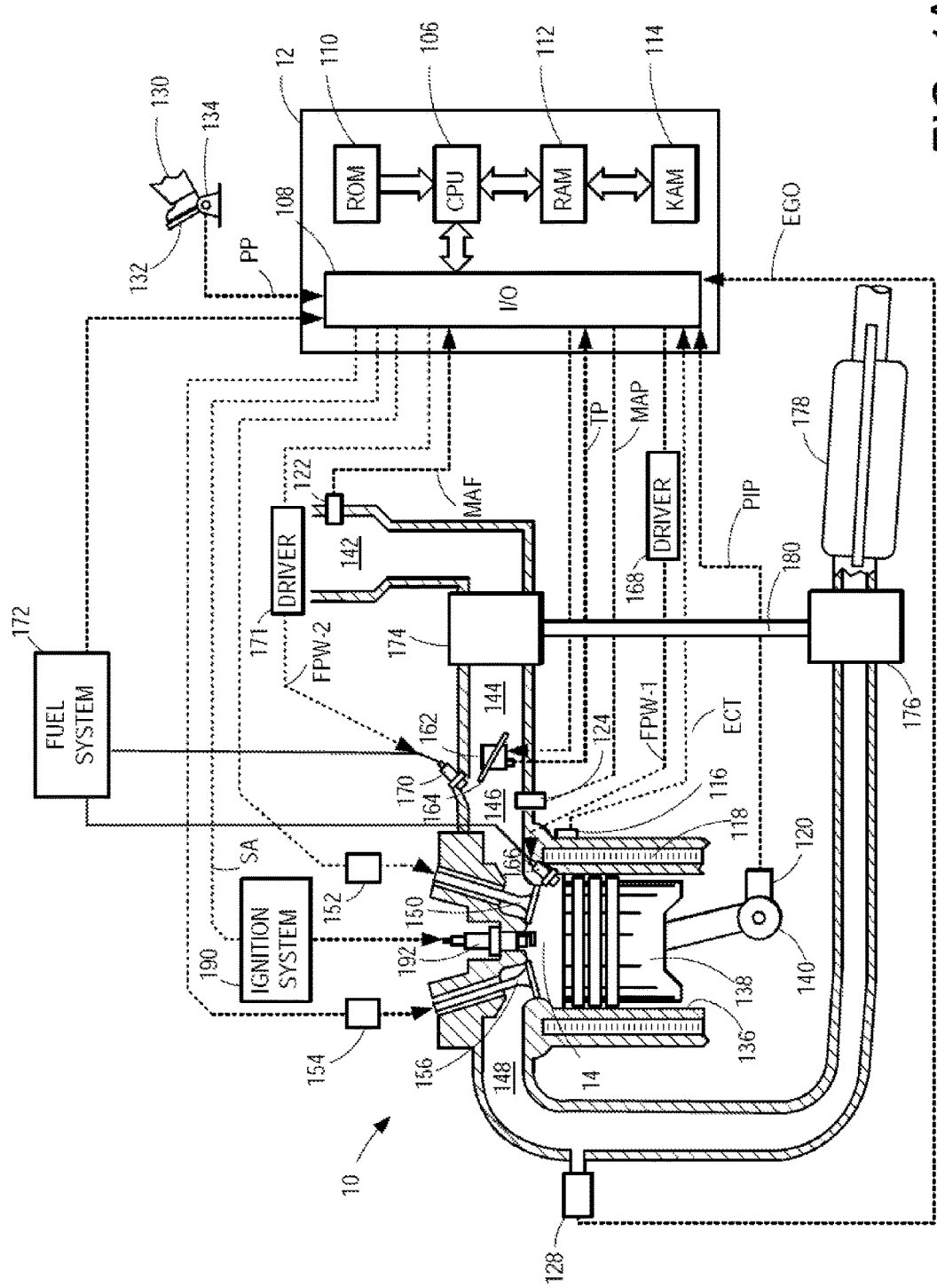
FIG. 1A shows a schematic of an example combustion chamber of an internal combustion engine.
Figure 1B:
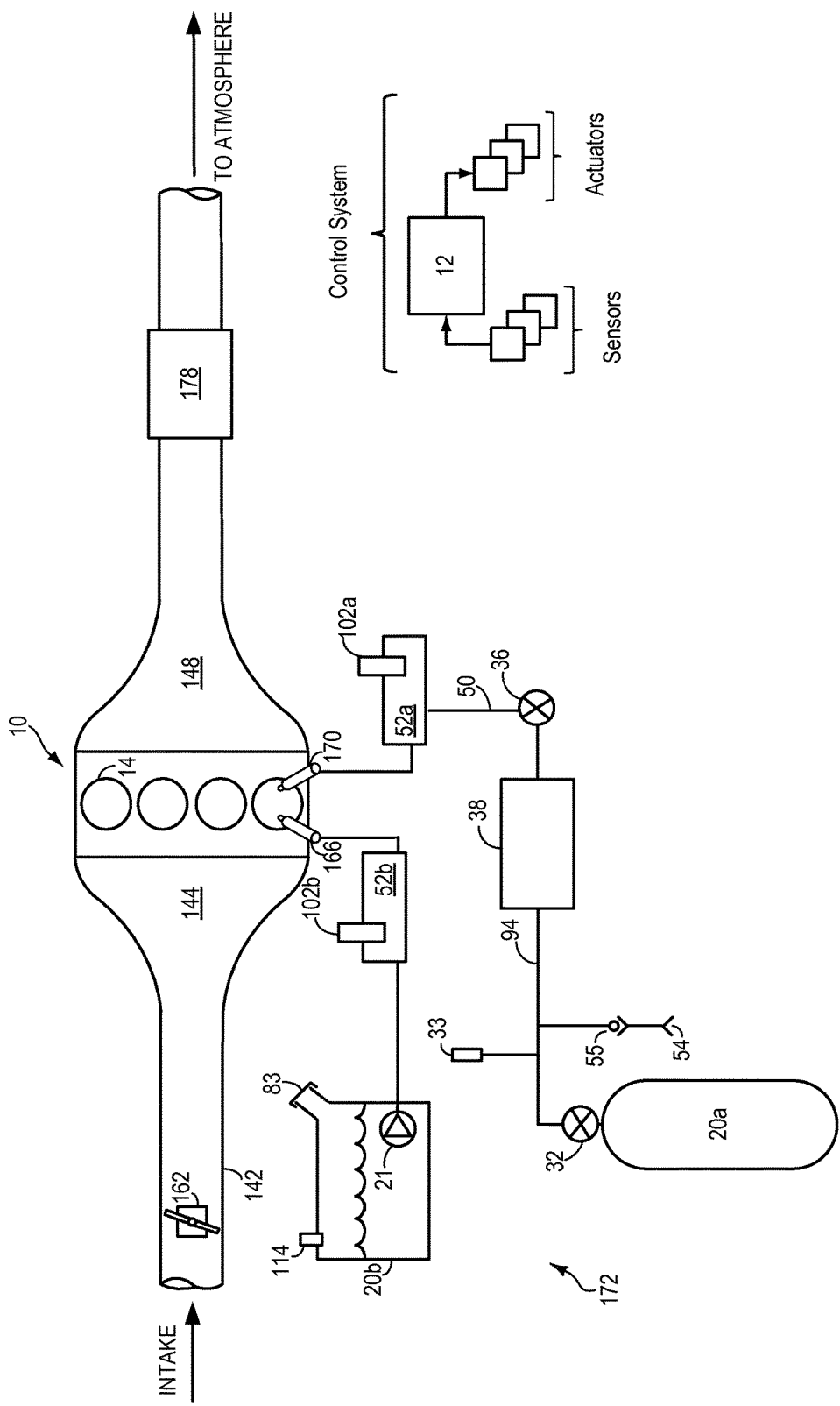
FIG. 1B shows a schematic diagram of a multi-cylinder engine.
Figure 4:
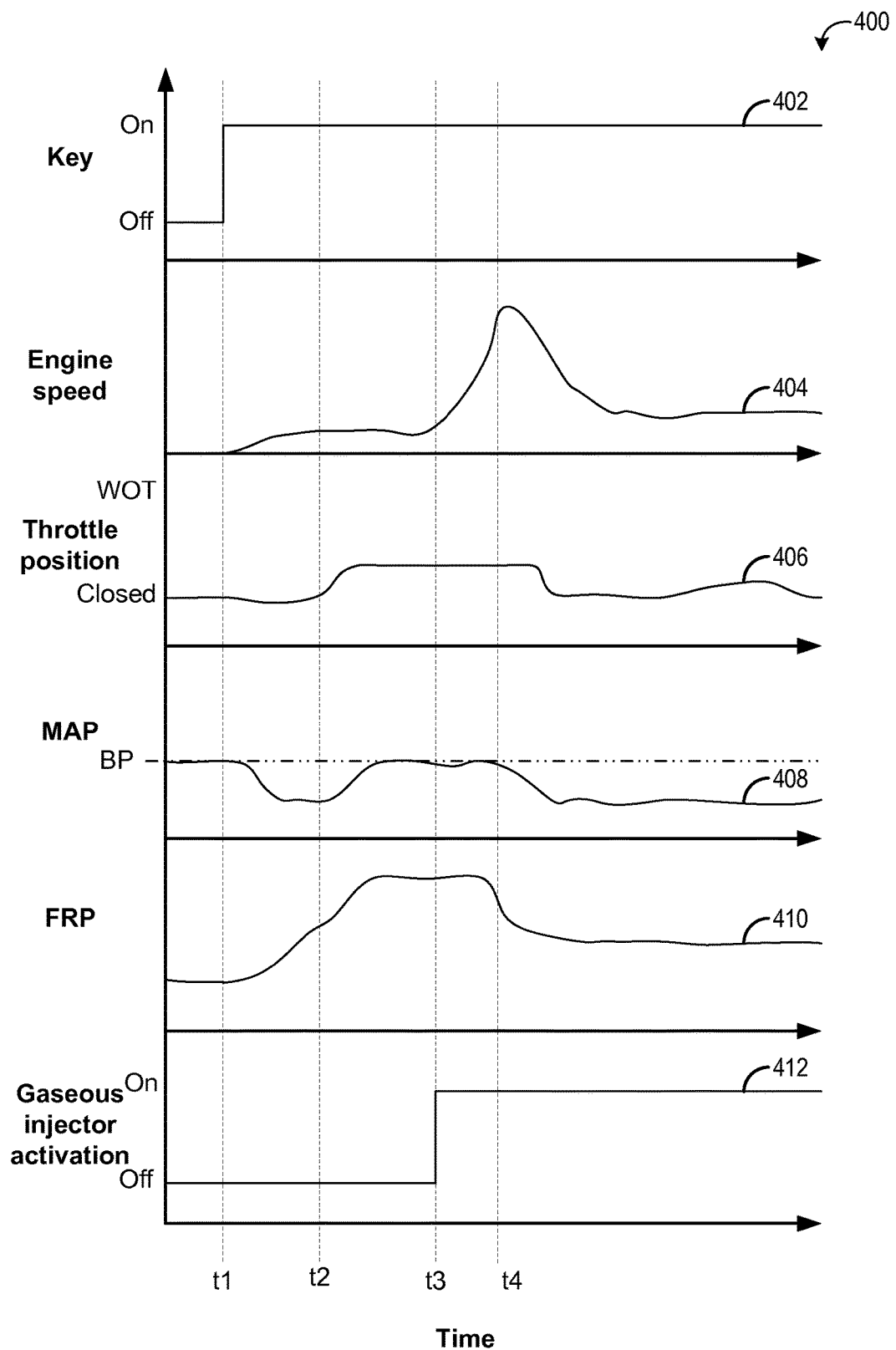
FIG. 4 is a diagram illustrating various engine operating parameters during a period of interest according to an embodiment of the present disclosure.
Figure 5:
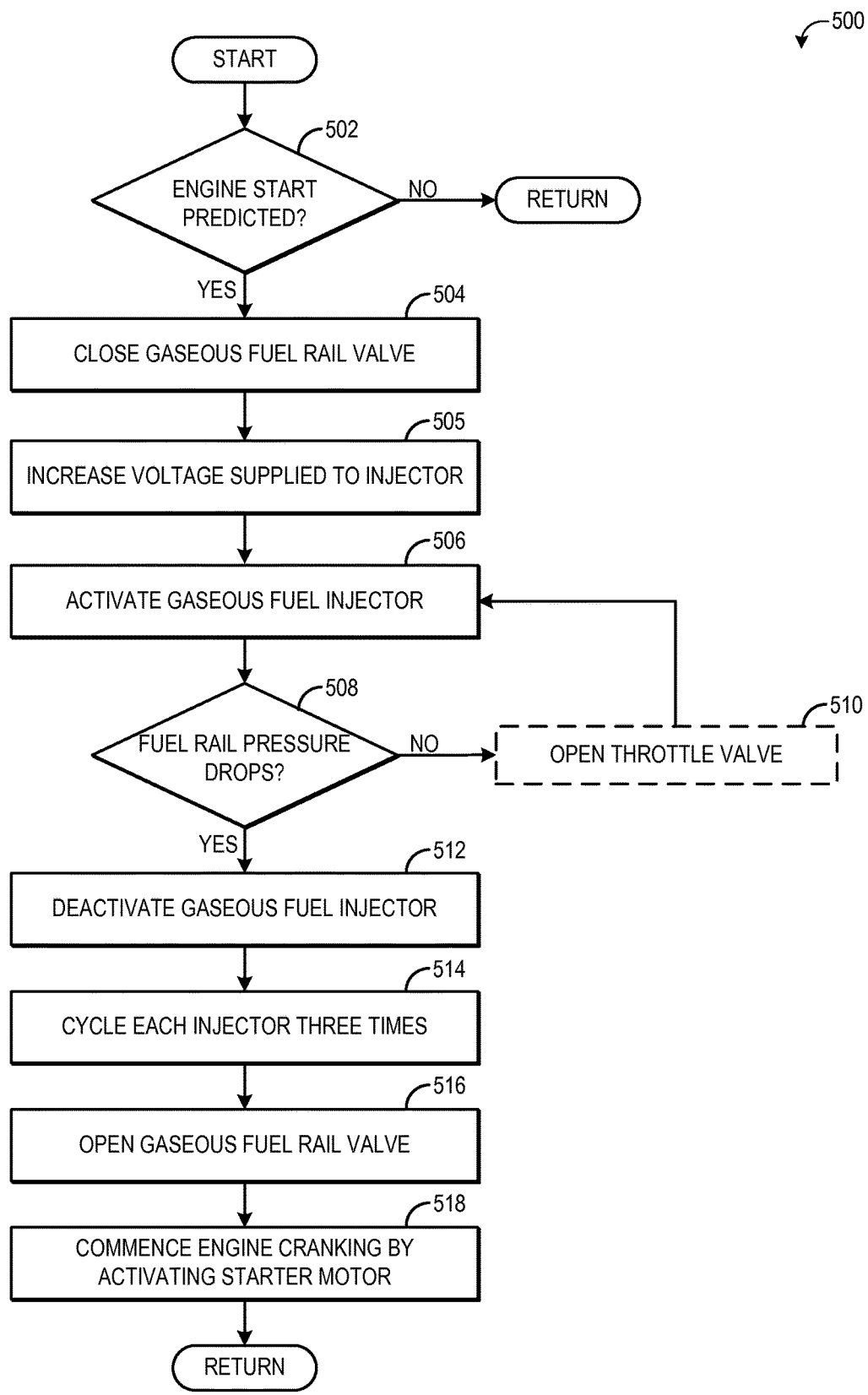
FIG. 5 is a flow chart illustrating a method for starting an engine according to another embodiment of the present disclosure.
Figure 6:
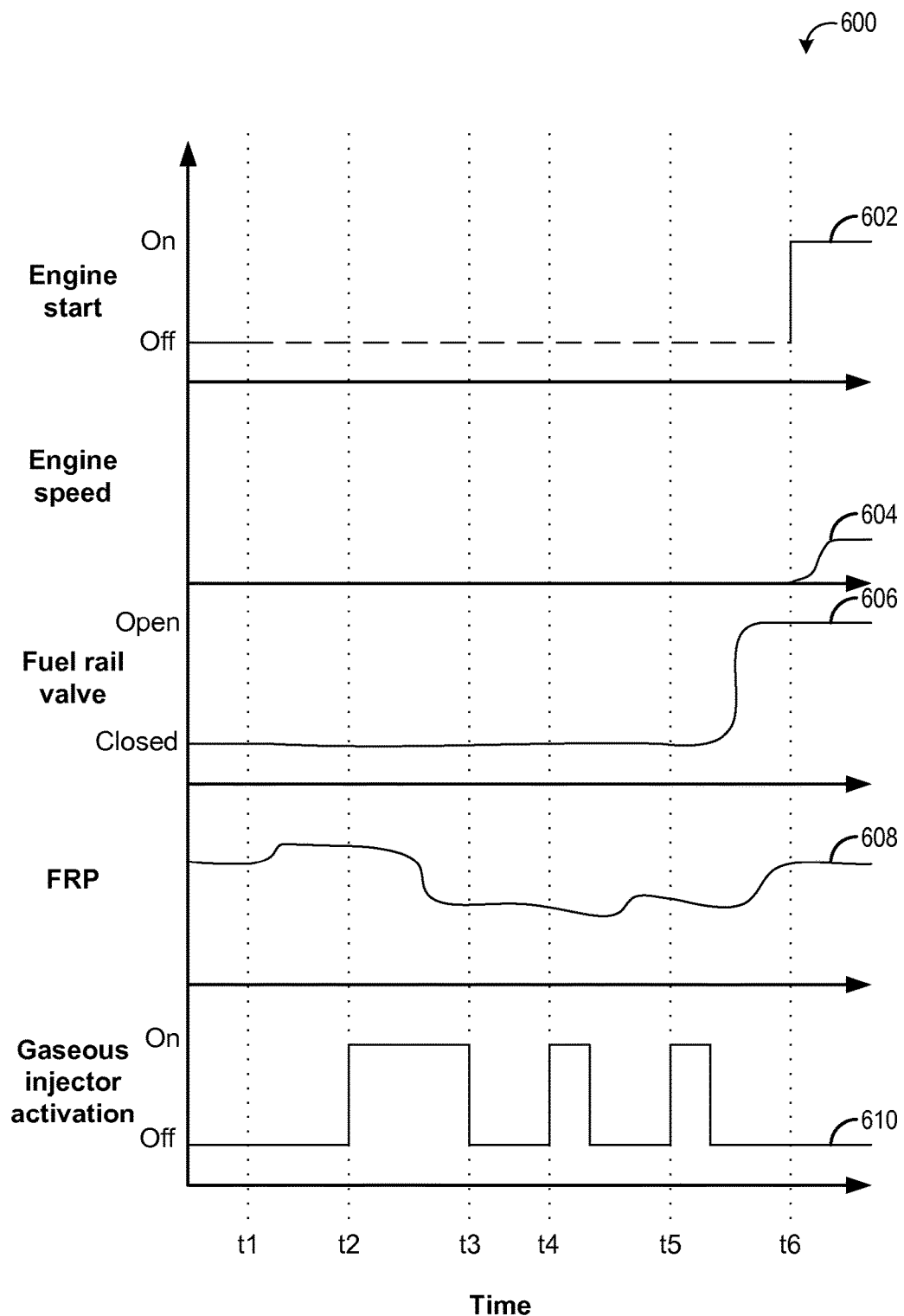
FIG. 6 is a diagram illustrating various engine operating parameters during a period of interest according to another embodiment of the present disclosure.

The following description relates to systems and methods for addressing activation of gaseous fuel injectors in an engine, such as the engines schematically diagrammed in FIGS. 1A and 1B. The systems may include a gaseous fuel tank coupled to a port-fuel injector and, in some embodiments, a liquid fuel tank coupled to a direct-fuel injector. A controller may be programmed to control the activation of the gaseous fuel injector through a control routine, such as the routines described in FIGS. 2, 3, 5, and 7, resulting in observed engine operating parameters as depicted in FIGS. 4 and 6.

FIG. 1A depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake passages 142, 144, and 146. Intake passage 146 can communicate with other cylinders of engine 10 in addition to cylinder 14. In some embodiments, one or more of the intake passages may include a boosting device such as a turbocharger or a supercharger. For example, FIG. 1A shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1A, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas AFR such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1A shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and also include a fuel tank holding a gaseous fuel, such as CNG. Fuel injectors 166 and 170 may be configured to inject fuel from the same fuel tank, from different fuel tanks, from a plurality of the same fuel tanks, or from an overlapping set of fuel tanks.

Controller 12 is shown in FIG. 1A as a microcomputer, including processor 106, input/output ports 108, an electronic storage medium for executable programs and calibration values shown as read-only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described at FIGS. 2, 3, 5, and 7.

As described above, FIG. 1A shows only one cylinder of a multi-cylinder engine. As such each cylinder may similarly include its own set of intake/exhaust valves, fuel injector(s), spark plug, etc. FIG. 1B shows a schematic, multi-cylinder diagram of the engine of FIG. 1A in accordance with the present disclosure. As depicted in FIG. 1A, internal combustion engine 10 includes cylinders 14 coupled to intake passage 144 and exhaust passage 148. Intake passage 144 may include throttle 162. Exhaust passage 148 may include emissions control device 178.

Cylinder 14 is shown coupled to fuel injectors 166 and 170. Although only one cylinder is shown coupled to fuel injectors, it is to be understood that all cylinders 14 included in engine 10 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions.

Fuel system 172 may include one or more fuel tanks. In the depicted example, the fuel system is a multi-fuel system including a high pressure fuel tank 20a configured to deliver a gaseous fuel to a fuel rail 52a, and a fuel tank 20b configured to deliver a fuel having chemical and physical properties different from the gaseous fuel (e.g., a liquid fuel) to fuel rail 52b. While the depicted example includes separate fuel rails for the two different fuels, in some examples a common fuel rail may be used.

Fuel tank 20a may be configured to store a gaseous fuel at high pressure and deliver the fuel to the engine 10 via high pressure fuel line 94, pressure regulator 38, and regulated pressure fuel line 50. For example, the gaseous fuel may be compressed natural gas (CNG), liquefied petroleum gas (LPG), absorbed natural gas (ANG), or hydrogen fuel. Fuel tank 20a may store the gaseous fuel in a pressure range of 10-700 bar (e.g., 0-100+ psi for LNG fuel, 500 psi for ANG fuel, 3600 psi, or 250 bar, for CNG fuel, and 5000-10,000 psi for hydrogen fuel).

In contrast, fuel tank 20b may store liquid fuel such as gasoline, fuel with a range of alcohol concentrations, various gasoline-ethanol fuel blends (e.g., E10, E85), and combinations thereof. As shown, fuel tank 20b may be coupled to a fuel pump 21 for pressurizing fuel delivered to the fuel rail.

Fuel tank 20a may be refilled with gaseous fuel via fueling port 54. A check valve 55 (or two check valves in series for redundancy) may be coupled between fuel tank 20a and the fueling port 54 to ensure correct flow of fuel. Similarly, fuel tank 20b may be refilled with liquid fuel via fueling port 83. Fuel may be delivered from fuel tanks 20a and 20b to the injectors of engine 10, such as example injectors 170 and 166, via fuel rails 52a and 52b, respectively. While only a single injector coupled with each fuel rail is depicted, it will be appreciated that additional injectors are provided for each cylinder 14. For example, fuel rail 52a may supply fuel to injector 170 as well as a second fuel injector supplying fuel to the same combustion chamber as injector 170.

In one example, where fuel system 172 includes a direct injection system, injectors 166 and 170 may be configured as direct fuel injectors. In an alternate embodiment, fuel system 172 may include a port injection system wherein injectors 166 and 170 may be configured as port fuel injectors. In still other embodiments, each cylinder may include one or more injectors including a direct injector and a port injector (such as the configuration illustrated in FIG. 1).

Pump 21 may not pump fuel from fuel tank 20b to fuel rail 52b during conditions where liquid fuel delivery to the engine is not desired (e.g., during engine off conditions, or during conditions where delivery of gaseous fuel alone to the engine is desired). A fuel rail pressure sensor 102b in fuel rail 52b may be configured to sense the current fuel rail pressure and provide the sensed value to controller 12 of control system 14. In some examples, pump 21 may be controlled based on the fuel rail pressure sensed by sensor 102b, and/or based on other parameter values.

Further, in some embodiments, a check valve (not shown) may be positioned between fuel tank 20b and fuel rail 52b to ensure correct flow of fuel from fuel tank 20b.

Fuel tank 20a may be coupled to a fuel tank valve 32 for regulating a pressure of the gaseous fuel delivered into fuel line 94. Fuel tank valve 32 may be configured to deliver the gaseous fuel into fuel line 94 at a pressure that is similar to tank pressure Alternatively, even when a high fuel injection pressure is desired, the fuel tank valve may be activated and a pressure regulation system downstream of the valve may be controlled to ensure that the fuel rail pressure is regulated to a sufficiently high pressure. Such operation may be preferable in examples where high pressure gaseous fuel flow through various components that may be included fuel line 94 (e.g., filters, valves, etc) would degrade the components.

Fuel tank 20a may further be coupled to a pressure regulation system to enable gaseous fuel to be provided to fuel rail 52a and from there to injector 170 at variable pressures. In one example, fuel tank 20a may store gaseous fuel in a pressure range of 10-700 bar, while the pressure regulation system may regulate the fuel rail pressure to a variable range of 2 to 40 bar (e.g., 2 to 10 bar for CNG fuel). The pressure of the fuel rail may be controlled via a pressure regulator 38. Regulator 38 may be a mechanical pressure regulator which controls a reference chamber pressure to a fixed, constant pressure to achieve a fixed, constant regulating pressure in a low pressure chamber, thus resulting in a single, fixed fuel rail pressure. In other embodiments, regulator 38 may be a variable pressure regulator. For example, regulator 38 may include pressure up and down conduits and valves which enable variation of a reference chamber pressure, the reference chamber pressure in turn varying the regulating pressure in the low pressure chamber and thus varying the pressure of the fuel rail.

As explained above, to supply the gaseous fuel to the engine cylinders, gaseous fuel is supplied at a high pressure from the gaseous fuel tank (e.g., tank 20a) to the pressure regulator (e.g., regulator 38). The pressure regulator then supplies the fuel to the gaseous fuel rail (e.g., rail 52a) at a lower set point fuel pressure, such as 10 bar for CNG fuel. However, under certain conditions the fuel may be supplied to the fuel rail at pressures higher than the set point pressure. For example, the regulator controlling the pressure of the fuel in the gaseous fuel rail may control the fuel rail to higher than normal pressure during cold ambient conditions and/or when gaseous fuel tank pressure is low. Further, during initial charging of the fuel rail during an engine start, the regulator may transiently overshoot the steady state set point fuel rail pressure.

When the fuel injection pressure increases, the amount of current needed to open the injectors also increases, as the force used to open the injector is directly proportional to the current supplied to the injector. High levels of current are frequently not available, particularly during engine starts. For example, during engine cranking, injector voltage is less available due to the engine electrical demand (e.g., the demand of the starter motor), cold ambient temperatures, and low engine speed (where the alternator does not add to the vehicle voltage). Further, if the injector temperature is high, the injector resistance is increased and thus less injector current is available for opening the injector.

As a result of the high fuel injection pressure and the lack of available voltage, the gaseous fuel injectors may not open immediately at start-up. Thus, engine starts with gaseous fuel may be delayed. As further elaborated with reference to FIGS. 2-6, these delayed starts may be mitigated by adjusting one or more operating parameters during or before an engine start. As explained below with regards to FIG. 3, the high fuel injection pressure, coupled with the intake manifold vacuum created by the cranking of the engine, creates a large pressure differential across the inward-opening gaseous fuel injectors. To alleviate this pressure differential and thus facilitate opening of the injectors with lower current, the engine throttle valve may be opened at start-up to increase the intake manifold pressure and reduce the pressure differential across the injectors. As explained with regards to FIG. 5, prior to initiating engine cranking, the gaseous fuel injectors may be opened and closed one or more times, effectively "unsticking" the injectors by breaking injector adhesion prior to pressurizing the fuel injectors. Once the injectors have been opened and closed (also referred to as cycling the injectors), the fuel rail may be repressurized and engine cranking may commence. Additionally, the voltage supplied to the injectors may be increased by operating the engine alternator at full field.

As explained above, the gaseous fuel injectors may experience difficulty opening at engine start-up. If the engine is configured to operate with multiple types of fuel (such as with both liquid fuel and gaseous fuel), the gaseous fuel injectors may also experience difficulty opening when the engine switches from operation with only liquid fuel (e.g., gasoline) to operation with gaseous fuel. For example, as the engine heats up during an initial gasoline operation, the gaseous fuel rail also increases in temperature, raising the pressure of the gaseous fuel in the fuel rail. As explained with regards to FIG. 7, if the engine includes a turbocharger, initiation of gaseous fuel injection may be delayed until the engine is operating with boosted intake air (e.g., intake manifold pressure greater than barometric pressure) to lower the pressure differential across the gaseous fuel injectors, or the turbocharger wastegate may be adjusted (e.g., closed) to increase boost pressure when gaseous fuel injection is initiated.

Figure 2:
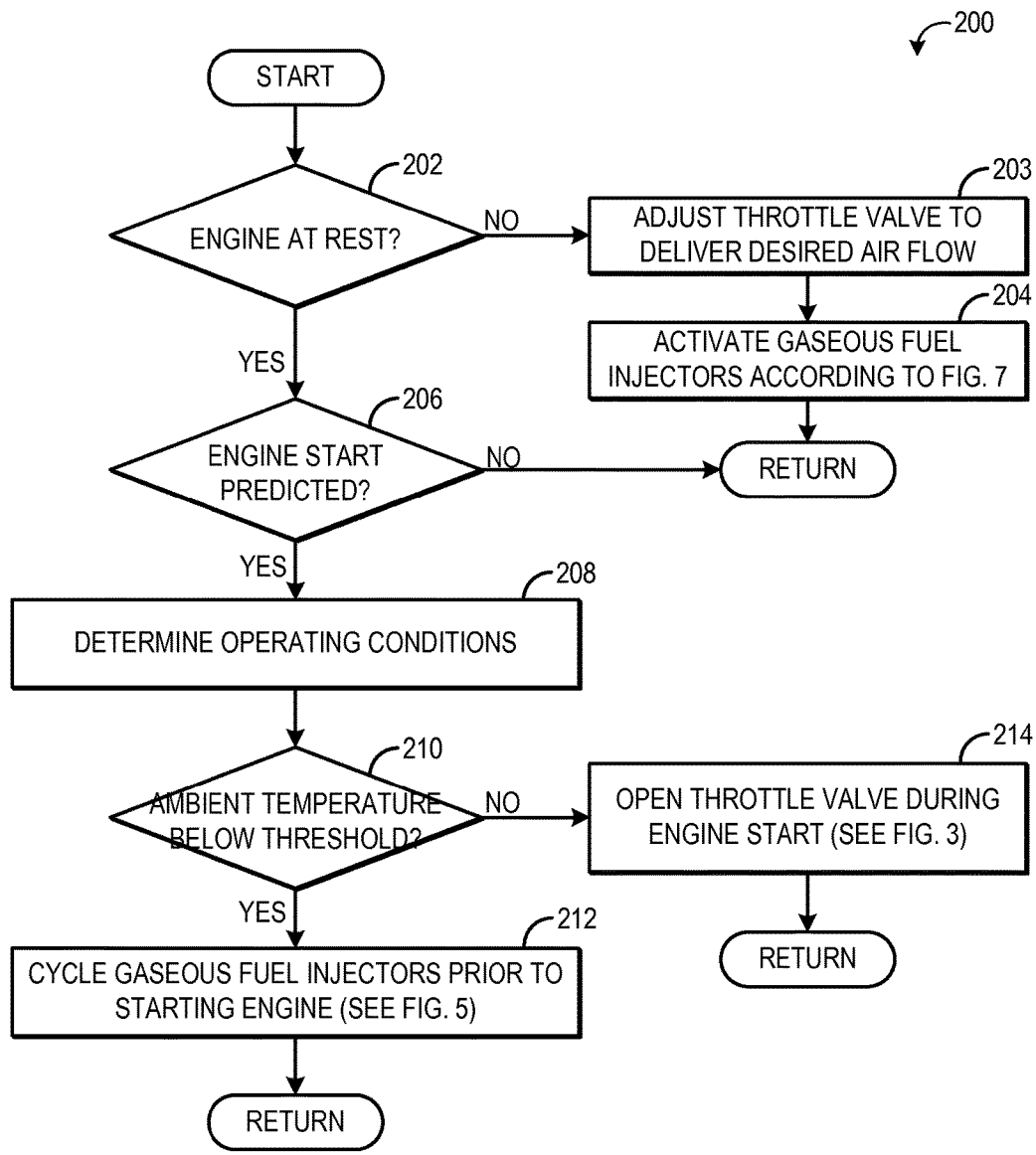
FIG. 2 is a flow chart illustrating a high-level control routine for activating a gaseous fuel injector according to an embodiment of the present disclosure.

Turning now to FIG. 2, a high-level control routine 200 for activating a gaseous fuel injector is illustrated. Method 200 may be carried out by an engine controller, such as controller 12 of FIGS. 1A-1B, according to instructions stored thereon. At 202, routine 200 includes determining if the engine is at rest. When the engine is at rest, no combustion is occurring, and thus no fuel is being injected to the cylinders. Further, the starter motor is not activated. If the engine is not at rest (e.g., if the engine is being cranked by the starter motor or combustion is occurring), routine 200 proceeds to 203 to adjust the throttle valve irrespective of a gaseous fuel injector pressure differential. For example, the throttle valve may be adjusted to deliver desired engine air flow. At 204, the gaseous fuel injectors are activated, when indicated, according to the method described below with respect to FIG. 7. Routine 200 then returns.

If the engine is at rest, routine 200 proceeds to 206 to determine if an engine start is predicted and/or requested. A predicted engine start may be an engine start that is estimated to occur within a given time based on current operating parameters. The engine start may be predicted to occur if a driver's side door is opened in one example. Other parameters that may predict an engine start is imminent include a key being inserted into an ignition, weight sensed in the driver's seat, etc. Further, an engine start request may be detected based on one or more parameters. For example, a key-on event, wherein an ignition key is turned to the on position, may indicate that an engine start has been requested. However, other mechanisms for requesting an engine start are possible, such as a user depressing an engine start button.

If an engine start is not requested or predicted, routine 200 returns. If a start is predicted or requested, routine 200 proceeds to 208 to determine operating conditions. The operating conditions determined at 208 may include ambient temperature, engine temperature, time since a previous engine shut-down, barometric pressure, current fuel rail pressure, and other conditions. At 210, routine 200 determines if ambient temperature is below a threshold. At low ambient and/or engine temperatures, the gaseous fuel injectors may be prone to sticking during commencement of fuel injection. Thus, if the temperature is below the threshold, the injectors may be cycled, as indicated at 212 and explained in more detail below with regards to FIG. 5. If the temperature is not below the threshold, the injectors may not be cycled. Rather, the throttle valve may be opened at engine start-up as indicated at 214 and described in more detail below with respect to FIG. 3. The throttle valve may be opened automatically at every engine start when ambient temperature is above the threshold, or it may be opened if a large pressure differential is present across the injectors at start-up. Routine 200 then returns.

As discussed above, when gaseous fuel injectors experience stiction at engine start, the injectors can be cycled prior to starting the engine and/or the throttle valve can be opened during engine start. While the injectors may be automatically cycled at each engine start, the cycling may delay cranking and/or release excess fuel to the engine intake. Thus, the injectors may be cycled only when conditions indicate that the injectors may be particularly difficult to open, such as during cold ambient temperature. To determine whether the injectors should be cycled prior to starting or if the throttle valve should be opened during the engine start, the ambient temperature may be assessed. If the ambient temperature is below a threshold (such as 10° C.), the injectors may be cycled prior to starting the engine.

However, if the routine determines that ambient temperature is not below the threshold, the injectors are not cycled. If a pressure differential exits across the injectors during the subsequent start-up, the throttle valve may be opened during the engine start. Other factors may influence whether the injectors are cycled or whether the throttle valve is opened. For example, if available voltage to the injectors is low prior to the engine start, the injectors may not be cycled. In other embodiments, the injectors may be cycled automatically, and if the injectors do not open during the cycling (or do not open once commanded to open upon commencement of fuel injection), the throttle valve may be open to relieve the pressure differential. Additionally or alternatively, if all the injectors do not open during the cycling, voltage supplied to the injectors may be increased by increasing alternator speed, running the alternator at full field, and/or reducing engine electrical demand.

Figure 3:
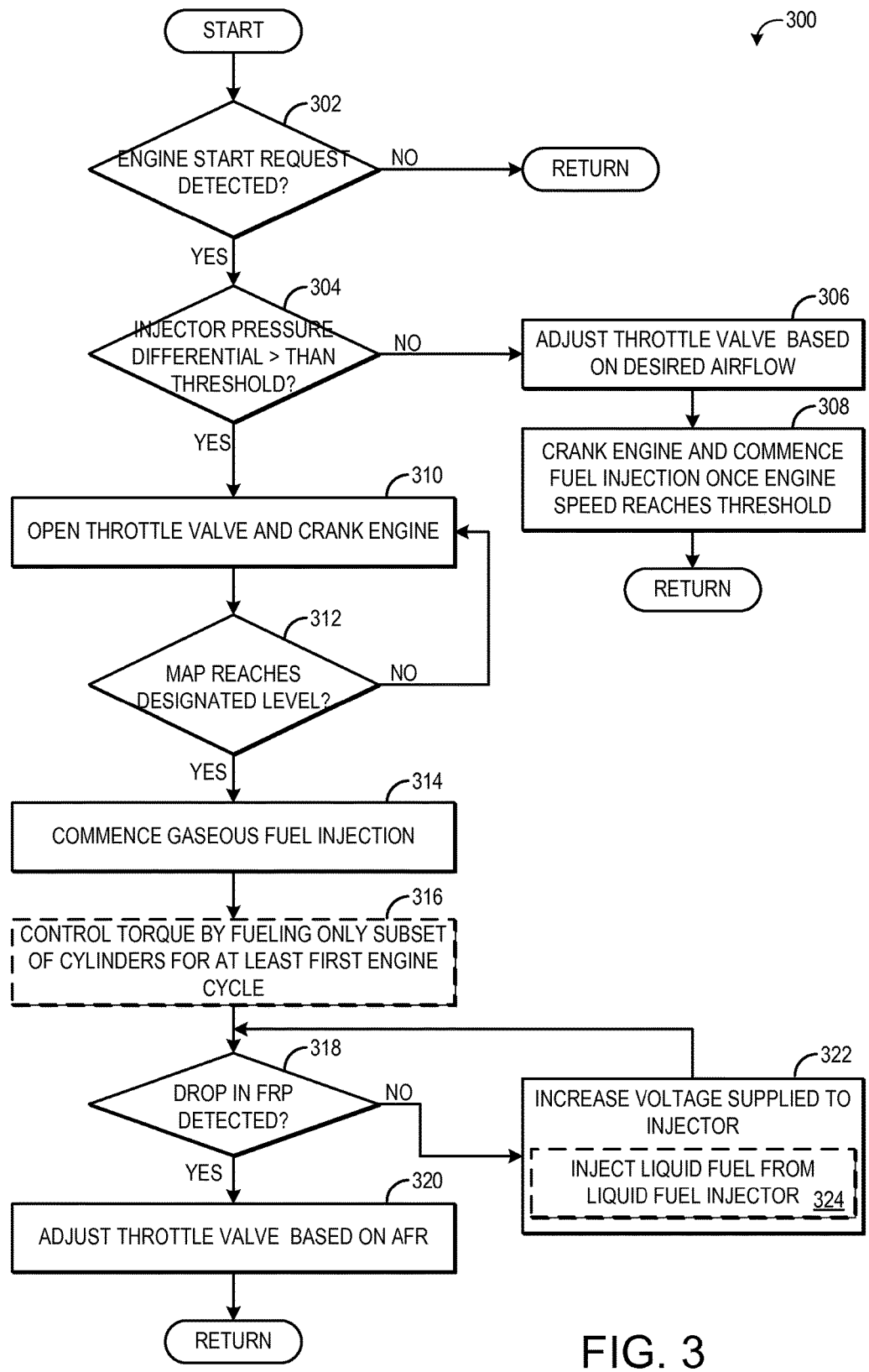
FIG. 3 is a flow chart illustrating a method for starting an engine according to an embodiment of the present disclosure.

FIG. 3 illustrates a method 300 for starting an engine. Method 300 may be carried out by an engine controller, such as controller 12 of FIGS. 1A-1B, according to instructions stored thereon. Method 300 may be carried out during a start of an engine, such as engine 10, to open a throttle valve, such as throttle 162, in order to facilitate the opening of one or more gaseous fuel injectors, such as injector 170.

At 302, method 300 includes determining if an engine start has been requested. An engine start request may be detected based on one or more parameters. For example, a key-on event, wherein an ignition key is turned to the on position, may indicate that an engine start has been requested. However, other mechanisms for requesting an engine start are possible, such as a user depressing an engine start button. If an engine start has not been requested, method 300 returns.

If a start has been requested, method 300 proceeds to 304 to determine if a fuel injector pressure differential is above a threshold. The fuel injector pressure differential may be the difference between the fuel injector pressure and the intake manifold pressure. The fuel injector pressure may be approximated by measuring the fuel rail pressure (FRP). The FRP and/or MAP may be determined based on input from pressure sensors, such as sensors 102a and 124. The threshold fuel injector pressure differential may be a suitable threshold where, at fuel injector pressures above the threshold, gaseous fuel injectors may experience difficulty opening. In one example, the threshold pressure differential may be approximated based on the FRP. That is, if the FRP is above a threshold, it may be determined that the pressure differential across the injector is high enough to induce injector stiction. The threshold FRP may be the set point pressure of the fuel rail, such as 10 bar. In some embodiments, the threshold may be fixed, that is, the threshold may not change regardless of operating conditions. In other embodiments, the threshold may vary based on conditions. For example, the threshold FRP or pressure differential may change depending on available vehicle voltage. If available voltage is relatively high (and thus more current is available to supply to the injectors), the threshold FRP may be higher than if available voltage is relatively low. The amount of voltage available to be supplied to the gaseous fuel injector may be determined based on one or more of injector temperature, a duration since engine stop after engine running, and engine speed. That is, the amount of voltage that can be applied to the injector may depend on injector temperature (high injector temperature increases the resistance of the injector), elapsed time since engine start (which may affect the vehicle electrical demand and voltage produced by the alternator), and engine speed.

If fuel injector pressure differential is not greater than the threshold, method 300 proceeds to 306 to adjust the position of the throttle valve irrespective of fuel injector pressure differential, such as based on desired engine airflow. For example, a manifold/cylinder filling model may be used to determine how much intake air, and in turn how much fuel, is needed to provide requested torque, and the throttle valve position may be adjusted to provide the needed air. At 308, the engine is cranked and fuel injection commences once engine position is determined and/or engine speed reaches a desired speed. Method 300 then returns.

However, if fuel injector pressure differential is greater than the threshold, method 300 proceeds to 310 to open the throttle valve and crank the engine. In some embodiments, the engine may be cranked, and fuel rail pressure may be monitored as the engine starts to spin. As the engine begins to crank, various factors may affect the pressure of the fuel rail. For example, the high pressure valve regulating the flow of gaseous fuel from the fuel tank to the fuel rail (e.g., valve 32 or 36 of FIG. 1B) may be opened to charge the rail with fuel, thus increasing the pressure of the rail. Further, the regulator may increase the pressure in the rail during certain conditions (such as low fuel tank pressure or cold ambient temperature). If the FRP exceeds the threshold once the engine is cranking, the throttle valve may be opened. In other embodiments, the throttle valve may be opened prior to commencement of engine cranking. For example, current fuel rail pressure may be determined, along with current operating parameters (e.g., ambient temperature, barometric pressure, etc.). If it is predicted fuel rail pressure may increase above the threshold once the engine starts cranking, the throttle valve may be opened proactively prior to initiation of cranking.

The throttle valve may be opened by a suitable amount. In one example, the throttle valve may be opened to wide open throttle to quickly bring the intake manifold pressure to barometric pressure. In another example, the throttle valve may be slowly opened (e.g., throttle angle may slowly increase) and the fuel injector pressure differential may be monitored. Once the differential is at or below the threshold, or once MAP reaches a desired pressure (such as barometric), the throttle valve adjustment may cease.

At 312, it is determined if MAP has reached a designated pressure. The designated pressure may be barometric pressure in one example. In other examples, the designated pressure may be a MAP that reduces the fuel injector pressure differential to a differential that allows the fuel injector to open. If the MAP has not reached the designated pressure, method 300 returns to 310 to continue to open the throttle and crank the engine. If the MAP has reached the designated pressure, method 300 proceeds to 314 to commence gaseous fuel injection. Commencement of fuel injection may depend on both MAP (where fuel injection begins once MAP reaches the designated pressure), engine position, and/or on engine speed. That is, once a threshold engine speed has been achieved via cranking of the engine by the starter motor and engine position is determined, fuel injection will begin once MAP is at the threshold level. To start the injection of fuel, one or more gaseous fuel injectors are opened by supplying the injector with current. The amount of force applied to open the injector may be proportional to the amount of current supplied to the injector. The injector may be opened for a given duration that is based on a desired amount of fuel that is to be injected.

At 316, it is determined if a drop in fuel rail pressure is detected. If a fuel rail valve is closed, the opening of the fuel injector will cause a decrease in the fuel rail pressure as the fuel is injected to the cylinder. As such, a drop in fuel rail pressure indicates an injector has opened. Thus, if a drop in FRP is detected, it is presumed an injector has successfully opened, and method 300 proceeds to 318 to adjust the throttle valve based on desired airflow. By adjusting the throttle valve based on desired airflow, the throttle valve may be adjusted to a more closed position. However, during fuel injection, the fuel rail may be charged with fuel by the regulator. As such, after one injector has opened and the fuel rail valve has opened to allow charging of the rail, the fuel rail pressure may build, causing stiction of the remaining injectors. As such, the throttle valve may be maintained open until all injectors have opened, or the throttle valve may be continued to be adjusted based on fuel rail pressure even after the engine start.

Further, method 300 may optionally include, at 320, controlling torque by fueling only a subset of cylinders for at least the first engine cycle. During typical engine starts (e.g., engine starts where fuel rail pressure is not above the threshold), the throttle valve may be substantially closed during some or all of engine cranking to create intake manifold vacuum. Thus, when fuel injection starts, a relatively small amount of fuel is needed due to the small amount of air charge in the cylinders. However, when the throttle is opened during cranking, more air may be present in the cylinders, and thus more fuel may be injected to maintain desired air-fuel ratio. To control torque during the start of fuel injection, one or more operating parameters may be adjusted. For example, only a subset of the cylinders may be fueled during the first engine cycle. Once fuel rail pressure has decreased and the throttle valve is adjusted to maintain airflow (and not maintained in an open position), each cylinder may be fueled. Other parameters may be adjusted during the engine start, such as spark timing.

Returning to 318, if a drop in fuel rail pressure is not detected, method 300 proceeds to 322 to increase the voltage supplied to the injector, if extra voltage is available. During engine cranking, available vehicle voltage may be relatively low, as the running of the starter motor utilizes extra voltage. Further, because the engine is not undergoing combustion, extra voltage produced by the alternator may not be available. However, if extra voltage is available, more current may be supplied to the injector to increase the force used to open the injectors. Additional voltage may be made available by running the vehicle alternator at full field or by reducing the electrical load on the vehicle (e.g., not operating an air conditioning compressor). Method 300 may then continue to monitor for a drop in FRP. However, in some embodiments, if extra voltage is not available and/or if the fuel injectors are not opening, liquid fuel may be injected from a liquid fuel injector at 324. If the engine is configured to operate with more than one type of fuel (gaseous fuel and liquid fuel, for example), the liquid fuel injector may be activated to supply the fuel needed to start the engine.

Thus, method 300 provides for opening a throttle during engine cranking when starting an engine with gaseous fuel. By opening the throttle during cranking (when engine combustion is not occurring), the intake manifold pressure may be increased, thus lowering the pressure differential across the fuel injector. By lowering the pressure differential across the fuel injector, the injector may open with less current, thus facilitating faster and more reliable engine starts with gaseous fuel.

FIG. 4 is a diagram 400 illustrating various operating parameters during an engine start with gaseous fuel. For example, diagram 400 may illustrate various operating parameters observed during the execution of the method of FIG. 3. The operating parameters illustrated in diagram 400 include engine start status (key on/off), engine speed, throttle valve position, MAP, FRP, and gaseous fuel injector activation status. For each operating parameter, time is depicted along the horizontal axis, and values of each respective operating parameter are depicted along the vertical axis.

Prior to time t1, the engine is off (and thus the engine is at rest), the throttle valve is in an unpowered position (partially open, e.g. 7 degrees), and MAP is equal to barometric pressure. At t1, a key on event is detected, as illustrated by curve 402. As a result, the engine starts to spin due to activation of the starter motor (e.g., current is supplied to the driver of the starter motor), and engine speed increases to a low cranking speed, such as 200 RPM (illustrated by curve 404). The throttle, illustrated by curve 406, remains near closed (e.g. 3 degrees). Because the engine is spinning and the throttle valve is closed, MAP decreases, as shown by curve 408. FRP may begin to increase, illustrated by curve 410, due to charging of the fuel rail. For example, the valve controlling flow of fuel from the fuel tank to the regulator may open and thus the rail may become charged with fuel.

At time t2, the FRP may reach a threshold pressure that, along with the low MAP, results in the gaseous fuel injectors requiring a large amount of current to open. As such, at time t2, the throttle valve may be opened. Diagram 400 depicts the throttle valve as being adjusted to an angle wide enough to bring MAP to near BP, which at low engine speed may be about 17 degrees; however, other throttle angles are also possible. Due to the throttle being opened, MAP increases.

At time t3, MAP has reached a designated level (e.g., barometric pressure) and engine position may be determined, and thus gaseous fuel injection commences with the activation of one or more gaseous fuel injectors (illustrated by curve 412). The injector activation depicted by curve 412 represents the activation of overall fuel injection for the entire engine. That is, curve 412 does not illustrate the opening/closing of a single injector but instead represents the ongoing activation of fuel injection. It is to be understood that each injector is individually opened and closed each engine cycle. Once combustion starts occurring in the engine, engine speed increases above engine cranking speed (e.g. 200 rpm) to a high value (e.g. 1500 rpm) and then drops to idle speed (e.g. 800 rpm). A drop in fuel rail pressure is detected at time t4, indicating at least one gaseous fuel injector has opened. This fuel pressure drop is a drop from the transient overcharge toward the steady state regulated pressure. That regulated pressure may still be higher than nominal due to regulator temperature or low tank pressure. As a result, the throttle is closed (or adjusted to a more closed position, such as back to 7 degrees) and MAP decreases. Following time t4, the throttle position is adjusted based on desired engine airflow.

Thus, the diagram 400 illustrates an engine start performed when MAP is equal to BP. Once the injectors are initially opened (and the engine starts), the engine torque may be controlled via engine throttling, adjustment to the number of cylinders fueled, etc.

Thus, FIGS. 3 and 4 illustrate a method for starting an engine using gaseous fuel that opens the throttle valve during or before engine cranking in order to reduce the pressure differential across the gaseous fuel injectors and facilitate rapid injector opening. While FIGS. 3 and 4 depict opening of the throttle valve responsive to the pressure differential across the gaseous fuel injector, in some embodiments, when an engine is started with gaseous fuel, the throttle valve may be opened during engine cranking regardless of FRP and MAP.

Once a gaseous fuel injector has been opened, it may become easier to open that injector. The inventors herein have recognized that by opening a particular injector three times, the injector becomes easier to open, even if the pressure differential across the injector is still relatively high. Thus, FIG. 5 illustrates a method 500 for opening and closing a gaseous fuel injector prior to an engine start.

Method 500 may be carried out by an engine controller, such as controller 12, according to instructions stored thereon.

Method 500 determines, at 502, if an engine start is predicted. A predicted engine start may be an engine start that is estimated to occur within a given time based on current operating parameters. The engine start may be predicted to occur if a driver's side door is opened in one example. Other parameters that may predict an engine start is imminent include a key being inserted into an ignition, weight sensed in the driver's seat, etc. If an engine start is not predicted, method 500 returns. If an engine start is predicted, method 500 proceeds to 504 to close a gaseous fuel rail valve. The gaseous fuel rail may be supplied with fuel from a gaseous fuel tank via a pressure regulator. The gaseous fuel rail valve may be a valve controlling flow of fuel from the fuel tank to the regulator (such as valve 32 of FIG. 1B) or may be a valve controlling flow of fuel from the regulator to the fuel rail (such as valve 36 of FIG. 1B). By closing the fuel rail valve, the flow of fuel to the rail may be blocked. In some embodiments, the gaseous fuel rail valve may be in the closed position prior to initiating the engine start (e.g., the valve may be in its non-powered, closed position before the engine is started). Thus, 504 may include maintaining the gaseous fuel rail valve in the closed position.

At 505, available voltage supplied to the injectors is increased. To increase the voltage, the alternator may be operated at full field beginning at the start of cranking. At 506, a gaseous fuel injector is activated. The gaseous fuel injector may be activated by supplying the injector with current, which opens the injector and allows fuel to flow to the cylinder. However, because the fuel rail valve is closed, only a small amount of fuel is initially fed to the cylinder.

At 508, it is determined if fuel rail pressure has dropped by a threshold amount. The drop in fuel rail pressure indicates that the fuel injector has opened. The threshold drop of fuel rail pressure may be any drop in rail pressure. In other embodiments, it may be a drop of at least a given amount, such as a decrease in fuel rail pressure of 10% or more. If a drop in fuel rail pressure is not detected, method 500 continues to activate the fuel injector at 508. Further, in some embodiments, if a drop in rail pressure is not detected within a threshold amount of time, the throttle valve may optionally be opened, as indicated at 510, to reduce the pressure differential across the injector, as explain above with respect to FIG. 3.

If a drop is fuel rail pressure is detected, method 500 proceeds to 512 to deactivate (and thus close) the fuel injector. At 514, each injector is cycled (e.g., opened and closed) a minimum number of times, such as three times. At 516, after each injector has been opened and closed the minimum number of times, the gaseous fuel rail valve is opened to repressurize the fuel rail. At 518, responsive to the fuel rail being repressurized and an engine start event (for example, a key-on event), engine cranking commences by activating the starter motor (e.g., supplying current to the starter motor). If not all the injectors are able to open, when the engine flares to a high speed (e.g., 1500 to 2000 rpm) after starting, the alternator may reach maximum output, thus raising the injector voltage and opening any injectors that have not opened.

Thus, method 500 opens and closes the gaseous fuel injectors prior to supplying current to the starter motor to initiate an engine start. By opening the injectors prior to starting the engine, the injectors will be more likely to open when they are activated during the engine start. For example, the pressure differential holding the injectors closed may be lessened by opening the injectors prior to starting the engine. The injectors may be opened one at a time or simultaneously. However, by opening each injector individually, changes in fuel rail pressure may be easier to detect and thus verification that each injector has opened may be carried out.

FIG. 6 is a diagram 600 illustrating various operating parameters prior to and during an engine start according to an embodiment of the disclosure. The parameters illustrated in diagram 600 may be observed during the execution of method 500 of FIG. 5, for example. The operating parameters illustrated in diagram 600 include engine start status, engine speed, fuel rail valve position, FRP, and activation status for a single gaseous fuel injector. For each operating parameter, time is depicted along the horizontal axis, and values of each respective operating parameter are depicted along the vertical axis.

Prior to time t1, the engine is off (shown by curve 602) and thus the engine is at rest (not spinning), as illustrated by curve 604. The fuel rail valve is in its default, non-powered closed position, illustrated by curve 606, FRP is at a baseline pressure (curve 608), and the gaseous fuel injector is inactivated (curve 610). At time t1, an engine start is predicted, based on a vehicle door opening and/or based on a key being inserted into an ignition for example. As such, the engine is still off, as shown by curves 602 and 604 being in the off position/zero engine speed, but curve 602 is depicted as a dashed line after time t1 to denote that a start is predicted.

When the engine start is predicted at time t1, the fuel rail valve remains closed. At time t2, the gaseous fuel injector is activated. To activate the injector, voltage is supplied to the injector at a first amount for a first duration, until a drop in FRP is detected prior to time t3. After the drop in FRP, the injector is deactivated. At time t4 and t5, the injector is activated a second and third time, respectively. The additional activations may include voltage being supplied to the injector at a second amount, less than the first amount, as the fuel rail pressure has decreased and thus less force is needed to open the injector. Further, the voltage may be supplied for a second, shorter duration.

After the injector has been activated and deactivated three times, the fuel rail valve is opened and the fuel rail is repressurized. Once a threshold level of pressure has been reached in the rail, engine cranking may commence if an engine on event is detected. For example, following opening of the fuel rail valve, at time t6 the engine may be cranked, causing an increase in engine speed. However, in other embodiments, the engine start request may be detected before the injector has cycled three times. In such circumstances, the engine start may be delayed until the injectors have been opened the requisite number of times. In other embodiments, if at least one injector has been opened at least one time, the fuel rail pressure may be decreased enough to allow the remaining injectors to open, and the engine may be started even if the injector has not been opened three times.

Diagram 600 depicts the fuel rail valve being in the closed position prior to the engine start prediction. However, in some embodiments, the fuel rail valve may be transiently opened responsive to a predicted engine start, or be open while the engine is off, and then the valve may be closed when it is determined the injectors will be cycled and remain closed until the injector has been cycled. The valve may then be opened to pressurize the fuel rail after the injectors have been cycled and/or once cranking begins. Further, diagram 600 illustrates the activation status for one gaseous fuel injector. Additional fuel injectors, whether for the same cylinder or for different cylinders, may be activated in a similar manner. However, once a first injector is opened, less voltage may be used to open subsequent injectors. The subsequent injectors may be opened simultaneously with the first injector, or may be opened sequentially, to allow for more accurate verification that the injectors have opened based on the drop in fuel rail pressure.

Figure 7:
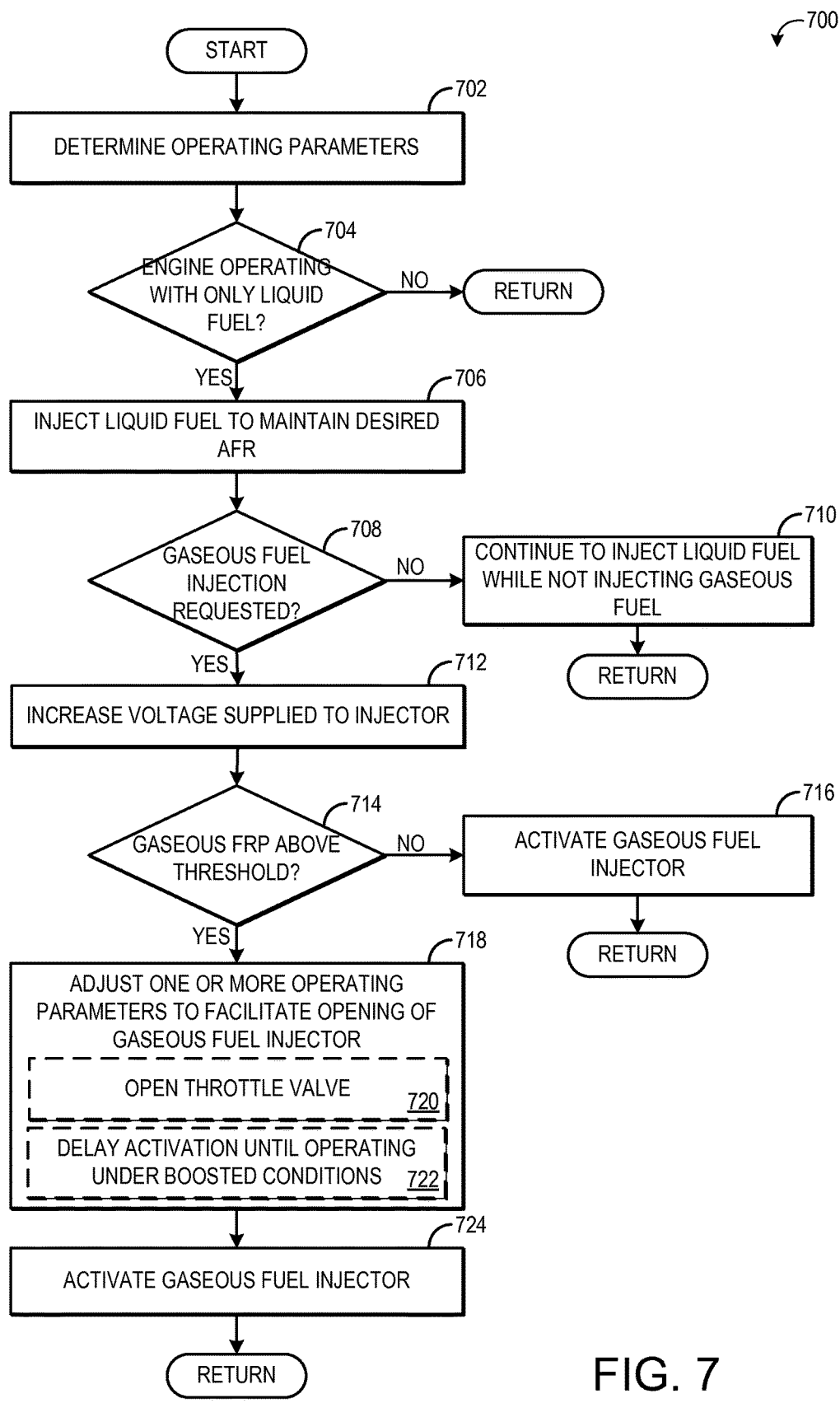
FIG. 7 is a flow chart illustrating a method for gaseous fuel injection according to an embodiment of the present disclosure.

Methods 300 and 500 presented above with respect to FIGS. 3 and 5 describe engine start procedures for gaseous fuel engines. Such engines may be configured to operate on more than one type of fuel. For example, the engine may operate with both gaseous fuel and liquid fuel (e.g., gasoline). Under certain conditions, such bi-fuel engines may operate with only liquid fuel injection, and switch to only gaseous fuel operation or both liquid and gaseous fuel operation. When gaseous fuel operation is initiated following liquid-fuel only operation, the gaseous fuel injectors may experience difficulty opening. FIG. 7 illustrates a method 700 for initiating gaseous fuel injection following liquid fuel injection.

Method 700 may be carried out by an engine controller, such as controller 12, in response to an indication to start gaseous fuel injection after a period of liquid fuel injection. The gaseous fuel may be injected via a gaseous fuel injector (such as injector 170 of FIG. 1B), while the liquid fuel may be injected via a liquid fuel injector (such as injector 166 of FIG. 1B).

At 702, method 700 includes determining engine operating parameters. Engine operating parameters may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc.

At 704, it is determined if the engine is operating with only liquid fuel injection, and not with gaseous fuel injection. The engine may operate with only liquid fuel injection during low load conditions, for example, or when gaseous fuel is unavailable. Operation with only liquid fuel may be determined based on operating conditions (such as engine load) or may be determined based on the status of the gaseous fuel injectors (if the gaseous fuel injectors are not activated, then operation with only liquid fuel may be determined). If the engine is not operating with only liquid fuel, that is if the engine is operating with at least some gaseous fuel injection, method 700 returns. If the engine is operating with only liquid fuel injection, method 700 proceeds to 706 to inject liquid fuel to maintain desired air-fuel ratio.

At 708, it is determined if gaseous fuel injection is requested. Gaseous fuel may be injected at higher loads, for example, or other conditions in order to control knock and/or conserve gasoline. If gaseous fuel injection is not requested, method 700 proceeds to 710 to continue to injection liquid fuel while not injecting gaseous fuel, and method 700 returns.

If gaseous fuel injection is requested, method 700 proceeds to 712 to increase voltage supplied to the gaseous fuel injectors. For example, the controller may command the vehicle to operate with higher voltage temporarily. While the injector may be designed to operate with 12V of electricity, it may be able to operate with additional voltage, such as with 15V, providing extra current/pintle force for opening the gaseous fuel injector when a high pressure differential is present. The vehicle voltage may be increased by operating the alternator at full field, by disconnecting the battery, or other mechanisms. Additionally, in some embodiments, prior to activation of gaseous fuel injection, the gaseous fuel injectors may be cycled to reduce the adhesion on the injectors, thus making it easier to open the injectors once gaseous fuel injection begins. During cycling of the injectors, each injector may be opened for a relatively short amount of time, in order to prevent the release of a substantial amount of fuel to the cylinders. Further, during the cycling, the fuel rail valve may be closed.

At 714, it is determined if the gaseous fuel rail pressure (and/or gaseous fuel injector pressure differential) is above a threshold. The threshold FRP may be similar to the threshold FRP discussed above with respect to FIG. 3. The threshold may be a fuel rail pressure, that along with the current MAP, creates a pressure differential across the gaseous fuel injector requiring a higher amount of current to open than is available. If the gaseous FRP is not above the threshold, method 700 proceeds to 716 to activate a gaseous fuel injector to inject the gaseous fuel, and method 700 returns.

If the gaseous FRP is above the threshold, method 700 proceeds to 718 to adjust one or more operating parameter to facilitate opening of the gaseous fuel injector. Adjusting one or more operating parameters may include opening the throttle valve at 720, as discussed above with respect to FIG. 3, to increase MAP and reduce the pressure differential across the injector. If the throttle valve is opened more than is indicated for delivering desired engine airflow, to compensate for the open throttle, additional fuel may be injected, spark timing may be adjusted, etc.

If the engine is a turbocharged or supercharged engine, the activation of the gaseous fuel injector may be initiated when operating under boost. When the engine is boosted, MAP may be equal to or greater than barometric pressure. Thus, the pressure differential across the gaseous injector may be relatively small. As indicated at 722, activation of the gaseous fuel injector may be delayed until the engine is operating under boosted conditions. If the engine is not operating under boosted conditions, one or more parameters may be adjusted to increase boost, such as closing a wastegate valve of a turbocharger.

After adjusting one or more operating parameters to facilitate opening of the gaseous fuel injector, method 700 proceeds to 724 to activate the gaseous fuel injector. After activating the fuel injector, once the fuel injector has opened (verified via a drop in gaseous fuel rail pressure, for example), the adjusted operating parameter may be returned to its pre-adjustment state (e.g., the throttle valve may be closed, the wastegate may be opened), and method 700 returns.

Thus, the systems and methods described herein provide for a method for starting an engine. The method comprises, responsive to a predicted engine start, if ambient temperature is less than a threshold, cycling one or more gaseous fuel injectors before starting the engine. If the ambient temperature is not less than the threshold, the method includes opening a throttle valve during cranking of the engine.

Cycling the one or more gaseous fuel injectors before starting the engine may include applying current to the one or more gaseous fuel injectors until a drop in fuel rail pressure is detected. Responsive to the drop in fuel rail pressure, the current supplied to the injector may be stopped. After the injector has been cycled at least a minimum number of times, the engine may be started by supplying current to the starter motor.

The method may include, following opening of the throttle valve, commanding a gaseous fuel injector open once manifold pressure reaches a threshold. After commanding the gaseous fuel injector open, if a drop in fuel rail pressure is detected the method may include closing the throttle valve.

The gaseous fuel injectors may be cycled only if current or predicted fuel rail pressure is greater than a threshold pressure. Similarly, the throttle valve may be opened during engine cranking only if fuel rail pressure, or a fuel injector pressure differential, is greater than a threshold.

In an embodiment, a method for an engine comprises supplying current to a gaseous fuel injector prior to supplying current to a starter motor of the engine, responsive to a predicted engine start request; and during cranking of the engine by the starter motor, opening a throttle valve of the engine prior to commencing combustion.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during running conditions of an engine, in response to a request to activate gaseous fuel injection, delaying activation of the gaseous fuel injection until an intake manifold pressure of an intake manifold through which intake air flows is determined to reach a threshold, and then activating gaseous fuel injection when intake manifold pressure reaches the threshold; and
in response to gaseous fuel rail pressure above a threshold, closing a wastegate valve of a turbocharger to bring intake manifold pressure to the threshold.

2. The method of claim 1, wherein the threshold intake manifold pressure is greater than or equal to barometric pressure, and wherein the engine is coupled to a gaseous fuel system having one or more fuel tanks configured to deliver gaseous fuel to a fuel rail, the fuel rail coupled to a gaseous fuel injector to provide the gaseous fuel injection.

3. The method of claim 1, further comprising deactivating liquid fuel injection responsive to the request to activate gaseous fuel injection, wherein the engine is turbocharged, wherein delaying activation until the intake manifold pressure is determined to reach the threshold includes delaying activation until the engine is operated under boosted conditions where the intake manifold pressure is equal to or greater than barometric pressure.

4. The method of claim 3, further comprising determining if a gaseous fuel injector has opened based on a change in fuel rail pressure responsive to the activation of the gaseous fuel injection, and if the gaseous fuel injector does not open, reactivating the liquid fuel injection.

5. The method of claim 1, further comprising, in response to gaseous fuel rail pressure above the threshold, opening a throttle valve to bring the intake manifold pressure to the threshold.

6. The method of claim 5, wherein if the throttle valve is opened more than indicated for delivering desired engine airflow, adjusting fuel injection and spark timing.

7. A method, comprising:
during running conditions of an engine, in response to a request to activate gaseous fuel injection, delaying activation of the gaseous fuel injection until an intake manifold pressure of an intake manifold through which intake air flows is determined to reach a threshold, then activating gaseous fuel injection when intake manifold pressure reaches the threshold; and
deactivating liquid fuel injection responsive to the request to activate gaseous fuel injection, wherein the engine is turbocharged, wherein delaying activation until the intake manifold pressure is determined to reach the threshold includes delaying activation until the engine is operated under boosted conditions where intake manifold pressure is equal to or greater than barometric pressure.

8. The method of claim 7, further comprising determining if a gaseous fuel injector has opened based on a change in fuel rail pressure responsive to the activation of the gaseous fuel injection, and if the gaseous fuel injector does not open, reactivating the liquid fuel injection.

9. The method of claim 7, further comprising increasing a throttle valve and monitoring a fuel injector pressure differential to bring the intake manifold pressure to barometric pressure.

10. The method of claim 9, further comprising ceasing adjusting the throttle valve when the fuel injector pressure differential is at or below a threshold or when intake manifold pressure is at barometric pressure.

* * * * *